United States Patent Office 3,077,324
Patented Feb. 12, 1963

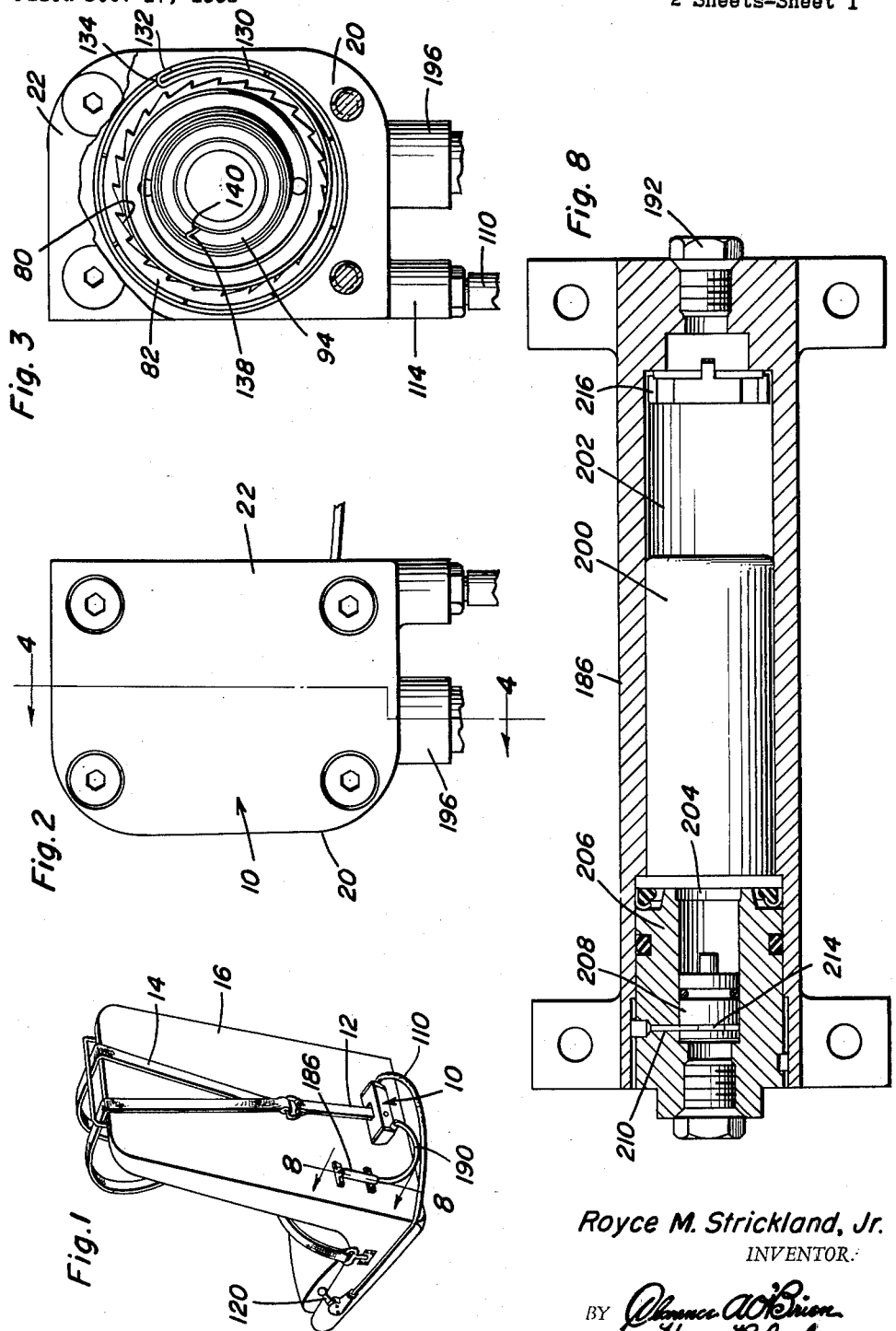

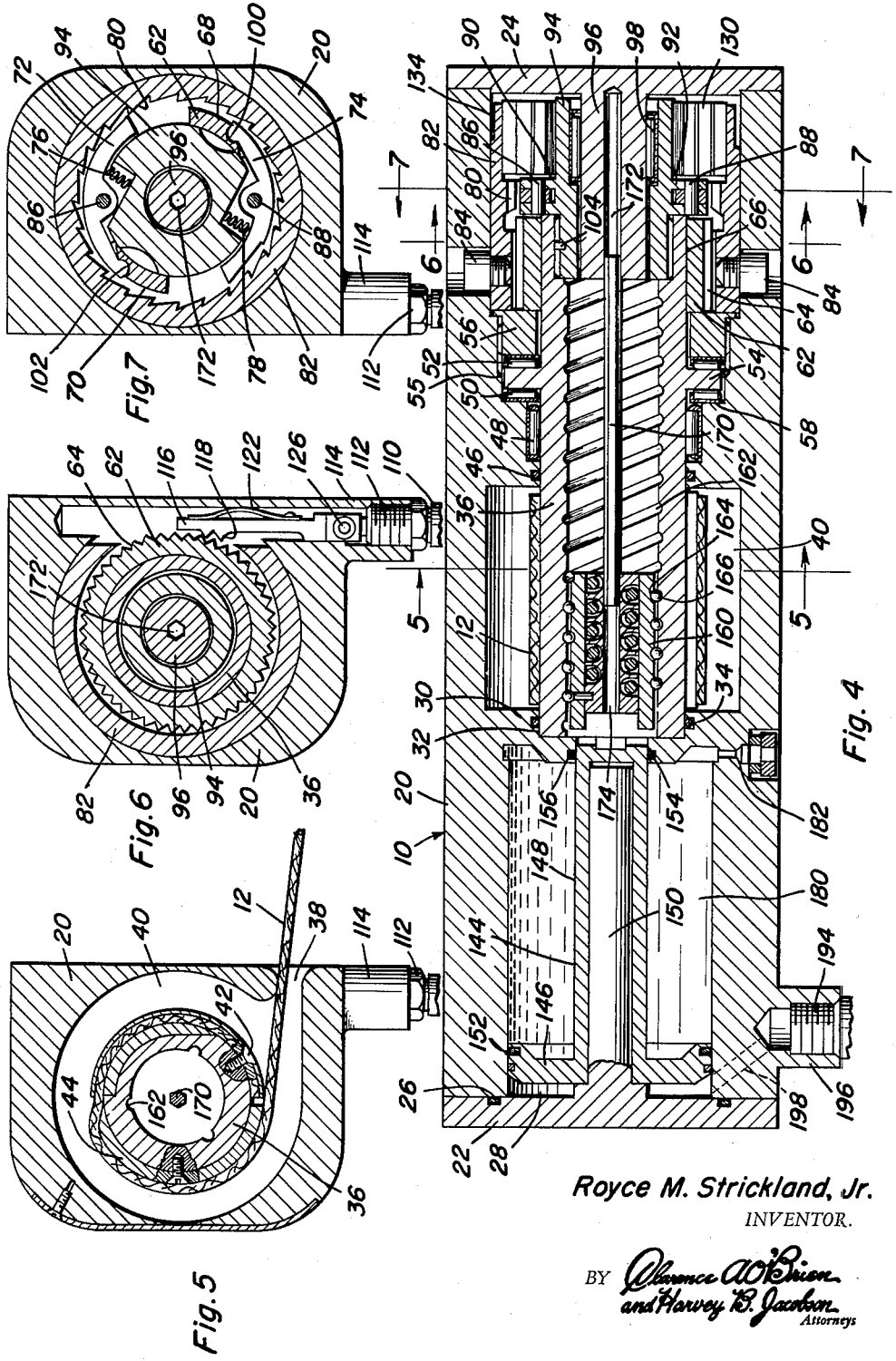

3,077,324
HARNESS INERTIA REEL
Royce M. Strickland, Jr., Scottsdale, Ariz., assignor, by mesne assignments, to Rocket Power, Inc., a corporation of Arizona
Filed Dec. 17, 1958, Ser. No. 781,014
16 Claims. (Cl. 244—122)

This invention relates to safety devices and more particularly to a safety device for the occupant of a seat in an aircraft or other fast moving vehicle.

Harnesses for seat occupants in aircraft are common, and there have been prior safety devices for taking up the slack in such harnesses. Other devices have been developed for locking the harness in a correct, adjusted position, the latter devices becoming operative in response to accelerations above a predetermined level.

An object of this invention is to provide a new unit capable of furnishing manual and automatic locking of the harness as well as full retraction of the harness at exceedingly high speed. Full retraction of the harness is particularly necessary for pre-ejection positioning of the seat occupant in military aircraft. This phase of the invention is achieved by a ballistic gas charge inasmuch as gas pressures may be developed almost instantaneously, and be applied rather easily to the working parts in the unit for obtaining full retraction of the harness, for example by winding a flexible elongate strap or cable on a reel and thereby pulling the harness to the correct, full-retraction position with no seat occupant effort.

One of the features of this invention attendant to the rapid, full retraction phase of the invention, is provision for retarding the winding movement of the strap or cable on the reel during the last revolutions or fraction thereof of the reel so that the seat occupant will not be subjected to intolerable forces when the harness is pulled to the full retraction position.

A further object of the invention is to provide a harness inertia unit for positioning the occupant of a seat in an aircraft, the unit being considerably more versatile than previous safety devices of this general class. The unit will enable the harness to be moved through a restricted range during which the reel of the unit is permitted to move in one direction against the yielding opposition of a return spring. Secondly, should the seat occupant wish, the reel may be manually locked, by actuation of a single lever, in any selected position. This lock, though, may be overridden for quick pre-ejection positioning as discussed above or released by further manual operation of the single control lever. Third, the reel may be automatically locked when the harness is subjected to an acceleration above a predetermined level, for example two or three g's. Here again, the locking action achieved in response to these accelerations may be overcome by actuation of the same single manual control lever used for locking the reel. Finally, an exceedingly quick operating, ballistic charge gas may be used for very rapid harness retraction, this retraction being to the full extent so that the seat occupant is automatically positioned for pre-ejection in an aircraft or other fast moving vehicle.

For aircraft use, and especially military craft, there are stringent specifications for weight, envelope size, performance and others. Therefore, a further object of the invention is to provide a harness inertia unit which is light, dependable, durable, but yet is capable of performance through a wide range of alternative operations. This is achieved by the design of the unit which would embody the principles of the invention.

The unit has a housing provided with a rotary reel and an inertia locking device having an inertia wheel. A return spring is attached at one end to the housing and operatively connected with the reel in order to oppose movement of the reel in one direction and rewind the reel or at least, provide a force on the reel in a direction tending to rewind it. The reel is capable of rotating until manually locked or until subjected to accelerations transmitted from the seat occupant to the harness and from the harness to the harness strap or cable and then to the reel.

The reel is made hollow so that it is light in weight and so that it may be driven from the inside very quickly by movement of a screw thread-like assembly in the reel. This screw thread-like assembly may be propelled in any manner. However it has been found that by using the gases generated upon firing of a ballistic charge, the response is immediate, sufficiently powerful and dependable. Although the invention contemplates the application of gases generated in some other way or pressures generated by other fluids, the ballistic charge gases are preferred for the reasons mentioned above and for others which are known to those familiar with ballistics and ballistic charges together with their behavior.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a largely diagrammatic perspective view showing a part of the seat harness, a seat, a unit for adjusting the harness together with a ballistic charge initiator for gases to be applied under pressure into the unit when full retraction of the harness is indicated.

FIGURE 2 is an end view of the unit.

FIGURE 3 is an end view of the unit, parts being broken away to illustrate otherwise hidden detail.

FIGURE 4 is a longitudinal sectional view taken on the line 4—4 of FIGURE 2.

FIGURE 5 is a transverse sectional view taken on the line 5—5 of FIGURE 4.

FIGURE 6 is a transverse sectional view taken on the line 6—6 of FIGURE 4.

FIGURE 7 is a sectional view taken on the line 7—7 of FIGURE 4.

FIGURE 8 is a longitudinal sectional view of the initiator and taken on the line 8—8 of FIGURE 1.

In the accompanying drawings there is a unit 10 to which a cable or strap 12, preferably the latter, is operatively connected. As shown in FIGURE 1 strap 12 is attached to a harness 14 in the back of seat 16, the latter being located in a vehicle capable of high speeds, for example a civilian or military aircraft, rocket, etc. Unit 10 is constructed of a housing 20 with attached end walls 22 and 24. The end wall 22 has a seal 26 since it partially encloses gas chamber 28 in housing 20. There is a transverse partition 30 in housing 20. Bearing 32 is formed in partition 30 and contains an O-ring 34 to contact a part of the surface of reel 36 which is mounted in bearing 32. Strap 12 enters housing 20 by passing through strap entrance 38 (FIGURE 5) and passing into reel chamber 40. The end of the strap is securely fastened to the reel 36 by screws 42 and filler plates 44 engaged in recesses in the surface of reel 36.

An O-ring 46 is mounted in a groove in a reduced diameter part of housing 20 and has a part of the surface of reel 36 contacting it. An anti-friction needle bearing 48 is disposed in a recess adjacent to O-ring 46 and further aids in mounting reel 36 for rotation in the housing. Two groups 50 and 52 of needle bearings, mounted at right angles to the needle bearing 48, contact opposite faces of circumferential flange 54 on reel 36. Bearings 50 and 52 are in an annular recess 55 constituted by a wall of retainer screw 56 threaded in housing 20 and an opposing surface 58 formed in the housing. The bearings 50 and 52 are mounted in this annular recess 55 and on opposite sides of the circumferential flange 54 which also occupies the annular recess 55.

An inertia lock is operatively connected with the reel and is actuated in a manner to be described subsequently. The construction of the inertia lock is seen best in FIGURES 4, 6 and 7. An inertia wheel 62 having exterior peripheral teeth 64, and a smooth bore 66, is mounted on the extremity of reel 36. The inertia wheel 62 is fitted snugly on the surface of reel 36 so that it rotates with the reel 36. However, if high acceleration forces are applied to the reel 36 the inertia wheel 62 will tend to remain at rest, and there will be slippage between the confronting surfaces of the reel 36 and the inertia wheel 62. When there is slippage the cams 68 and 70 which protrude from one end of the inertia wheel 62 with respect to the two pawls 72 and 74 enable the springs 76 and 78 to project one end of each pawl outwardly to engage fixed teeth 80 attached to a sleeve 82 which is fixed as by pins 84, to the housing. Pawls 72 and 74 are mounted between their ends on pins 86 and 88 located in openings in the pairs 90 and 92 of ears that protrude radially outwardly from the surface of sleeve 94. Sleeve 94 is rotatably mounted on fixed spindle 96 attached to wall 24, there being an anti-friction bearing 98 to assure free rotation of the sleeve 94 insofar as spindle 96 is concerned. Cams 68 and 70 have pockets 100 and 102 within which the enlarged end parts of pawls 72 and 74 ordinarily rest. However, when there is slippage between the inertia wheel and reel 36, the cams move with respect to sleeve 94 that is connected by threads locked by pellets 104 to reel 36 so that the cams occupy a different position with respect to the ends of the pawls and enable the springs 76 and 78 to project the pawls outwardly so that their ends engage comparatively fixed teeth 80. This locks reel 36 so that it cannot rotate.

It is evident that the pawls 74 and 72 may be withdrawn from engagement with teeth 80 by returning the cams to their original, rest position (FIGURE 7). There are manual means for doing this. A conventional pull cable 110 is secured by a fitting 112 in a socket 114 of housing 20 (FIGURE 6). There is a rod 116 at the inner end of the cable, and it is provided with teeth 118 which are adapted to engage the teeth 64 of inertia wheel 62 when the pull cable is moved by lever 120 in the proper direction. Leaf spring 122 on rod 116 contacts a surface of the housing to assure that the teeth 118 will engage teeth 64, however, the rod 116 being on a pivot 126 may be slid over the teeth 64 when sufficient force is applied to lever 120 and leaf spring 122 flexes. Thus, movement of inertia wheel 62 by actuating lever 120 fully in one direction and then fully in the opposite direction, will cause the cams 68 and 70 to be moved with respect to sleeve 94 in order to engage the enlarged ends of the pawls 72 and 74 in the recesses 100 and 102 in the cams.

There is a return spring 130 mounted in one end of housing 20. The return spring has a curved end 132 in a slot 134 formed in stationary sleeve 82. The opposite end 138 of the torsion spring 130 is engaged in a slot 140 in the outer end of rotary sleeve 94. Return spring 130 applies a yielding force to the reel 36 by way of rotary sleeve 94 that is threaded and locked by pellets 104 in one end of the hollow reel 36. Therefore the strap 12 may be pulled in a direction extending it from unit 10, but there is always a yielding force, applied by torsion spring 130, tending to rewind the strap 12 on the reel.

There are means operatively connected with reel 36 for very rapidly retracting harness 14 by winding strap 12 on the reel with a considerable force. These means consist of a piston 144 having a piston head 146 slidable axially in chamber 28. The piston rod 148 is hollow and has a guide pin 150 mounted therein. The guide pin is attached to wall 22 in order to constrain the movement of piston 144. Piston rings 152 are on the piston head to prevent blow by when gas under pressure is applied to the gas chamber. The inner end of piston rod 148 is mounted in an opening 154 in partition 30, and there is an O-ring seal 156 in opening 154 and contacting the surface of piston rod 148. The inner extremity of the piston rod 148 contacts the end of an assembly 160 which functions as a driver for reel 36 in response to axial movement of piston 144 toward and into hollow reel 36. A screw thread 162 is in the hollow reel, and the driver has a plurality of peripheral recesses 164 accommodating thrust balls 166 which are located in the screw thread 162. An anti-rotation rod 170 having a non-circular cross section, is axially slidable in passage 172 of spindle 96, the passage having a cross section similar to the cross section of rod 170. Similarly, there is a passage 174 in the center of the driver 160, and passage 174 has rod 170 mounted in it. It is now evident that when the piston 144 moves in one direction that is, toward the right in FIGURE 4, the inner extremity of the piston rod strikes the driver 160, propelling it axially and non-rotationally through the center of the hollow reel 36. Since the driver has a threaded connection with the reel 36, the reel must rotate thereby winding strap 12 onto the reel.

There is a liquid 180 in the housing 20, the liquid confined between partition wall 30 and one surface of the head 146 of the piston 144. A bypass orifice 182 is in a wall of the housing 20, and the bypass has a calibrated orifice designed to reduce the speed of the piston 144 as it approaches the end of its travel so that intolerable forces are not transmitted to the seat occupant when the harness is promptly retracted by the action of gas pressure applied in chamber 28. It is preferred that the gas pressure be generated in an initiator 186 (FIGURE 8) and piped to chamber 28 by conduit 190 that is secured by a fitting 192 to the initiator and by a fitting 194 to a socket 196 in the housing 20. A passage 198 extends from the socket 196 to the chamber 28.

The initiator 186 has a ballistic propellent charge containing cartridge 200 in a chamber 202, together with an igniter 204 at one end of the cartridge. Breech block 206 is in one end of chamber 202 and supports a firing pin 208 together with a shear pin 210 fitted in a groove 214 of the firing pin 208. When a force of sufficient magnitude is applied to the firing pin 208 to break shear pin 210, the firing pin is projected against the igniter 204, and this causes the content of the cartridge 200 to burn and gases to issue through the discharge orifices 216 in advance of fitting 192. The gases are then conducted under considerable pressure to chamber 28. Any means, either manual or automatic, may be used to apply a sufficient force to firing pin 208 in order to set off the charge.

In operation, after installation as disclosed in FIGURE 1 or in some other suitable manner, the seat occupant has his harness 14 under his control, but may rely on automatic locking and retraction should conditions warrant locking and/or retraction of the harness. With control lever 120 in a non-locking position the reel 36 is capable of rotating in a direction to pay out strip 12, but the rotation is yieldingly opposed by the opposition of spring 130. Therefore harness 14 remains snug against the seat occupant enabling the occupant to move comfortably.

Should the seat occupant wish to lock the reel, he need only adjust lever 120 and this brings teeth 118 into engagement with teeth 64 of the inertia wheel 62. Reel 36, then, cannot rotate since there is sufficient friction generated between the confronting surfaces of the inertia wheel and reel to hold strip 12 in a locked position.

Under high acceleration loading, for instance the occupant being subjected to the order of two or three gravities acceleration, the harness 14 is subjected to the same acceleration and this acceleration is ultimately transmitted to the reel 36. It is sufficient to move the reel 36 with respect to the inertia wheel 62 and engage the inertia locking pawls with the stationary teeth 80. Accordingly, the reel becomes locked by the action of the pawls and hence, the harness is also in a locked position.

In an emergency, for example when a pilot or other occupant of seat 18 is preparing for ejection, the ejection mechanism may be operatively connected with the initiator firing pin 208 to cause the firing pin to strike igniter 204 and ultimately have gases issue through conduit 190 and become applied to chamber 28. This forces the piston 144 in a direction to move the reel rotating assembly 160 very quickly and in a direction to rotate the reel 36 to wind strap 12 onto the reel. During this movement the pawls 70, 72 and 74 override teeth 80 in the nature of a one way ratchet. The final movement of the piston is arrested by having the fluid 180 pass through a calibrated orifice 182. The action of the reel being moved in this manner causes full retraction of strap 12, pulling harness 14 to the seat occupant pre-ejection position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A harness inertia unit for positioning the occupant of a seat in a vehicle, said unit comprising a reel housing, a reel mounted for rotation in said housing, an elongate flexible member on said reel and adapted to connect to the harness, an inertia wheel mounted for movement with respect to said reel when the reel is subjected to a torque load above a predetermined level, an inertia lock connected for actuation by said wheel when there is relative movement of said inertia wheel with respect to said reel for locking said reel and thereby preventing further movement of said reel, said inertia lock comprising stationary teeth in said housing disposed outwardly of said inertia wheel, pawls pivoted to said reel and biased in a direction to engage said teeth to thereby lock said reel, said wheel being mounted on said reel and having cam surfaces normally engaging said pawls to retain the latter out of engagement with said teeth and movable out of engagement with said pawls in response to said relative movement between said wheel and reel to permit said pawls to be biased into engagement with said teeth to effect the locking of said reel.

2. A harness inertia unit for positioning the occupant of a seat in a vehicle, said unit comprising a reel housing, a reel mounted for rotation in said housing, an elongate flexible member on said reel and adapted to connect to the harness, an inertia wheel mounted for movement with respect to said reel when the reel is subjected to a torque load above a predetermined level, an inertia lock connected for actuation by said wheel when there is relative movement of said inertia wheel with respect to said reel for locking said reel and thereby preventing further movement of said reel, said inertia lock comprising stationary teeth in said housing disposed outwardly of said inertia wheel, pawls pivoted to said reel and biased in a direction to engage said teeth to thereby lock said reel, said wheel being mounted on said reel and having cam surfaces normally engaging said pawls to retain the latter out of engagement with said teeth and movable out of engagement with said pawls in response to said relative movement between said wheel and reel to permit said pawls to be biased into engagement with said teeth to effect the locking of said reel, and a return spring reacting on said housing and ultimately reacting on said reel to rewind said reel.

3. A harness inertia unit for positioning the occupant of a seat in a vehicle, said unit comprising a reel housing, a reel mounted for rotation in said housing, an elongate flexible member on said reel and adapted to connect to the harness, an inertia wheel mounted for movement with respect to said reel when the reel is subjected to a torque load above a predetermined level, an inertia lock connected for actuation by said wheel when there is relative movement of said inertia wheel with respect to said reel for locking said reel and thereby preventing further movement of said reel, a piston in said housing, means for introducing a ballistic gas charge into said housing to move said piston, and means driven by said piston for imparting rotational movement to said reel to cause forcible retraction of the harness connected member on the reel.

4. The harness inertia unit of claim 3, wherein there is a liquid in said housing on the side of the piston opposite that exposed to gas pressure, and a bypass orifice through which the liquid flows to slow the movement of said piston.

5. A device to control the movement of an elongate flexible member comprising a reel housing, a reel mounted for rotation in said housing, an elongate flexible member on said reel and adapted to connect to a harness, an inertia wheel mounted for movement with respect to said reel when the reel is subjected to a torque load above a predetermined level, an inertia lock connected for actuation by said wheel when there is relative movement of said inertia wheel with respect to said reel for locking said reel and thereby preventing further movement of said reel, a return spring reacting on said housing and ultimately reacting on said reel to rewind said reel, said reel and inertia wheel being essentially freely movable as a unit within the limits of movement of said flexible member with said spring applying yielding opposition to movement of said reel in one direction, and additional means engaging said reel for rapidly rotating said reel in a direction to wind said member on said reel, said additional means including a chamber in said housing, a piston in said chamber, means registered with said chamber to receive fluid under pressure on one face of said piston to move said piston, and means operatively connected with said reel and actuated by said piston to impart rotational movement of said reel in response to movement of said piston.

6. In a harness for the occupant of a seat in a high speed vehicle and wherein there is a flexible element attached to the harness, a safety device connected to said element and including a housing, a reel in said housing, said reel adapted to be essentially freely rotatable so that said element is capable of being paid out and retracted in accordance with movements of the harness, inertia locking means connected with said reel for locking said reel in response to accelerations applied to the harness and element above a predetermined level, and gas actuated means operable by gas pressure to rapidly rotate said reel in a direction to rapidly wind said element on said reel to position the harness in the fully retracted position.

7. In a harness for the occupant of a seat in a high speed vehicle and wherein there is a flexible element attached to the harness, a safety device connected to said element and including a housing, a reel in said housing, said reel adapted to be essentially freely rotatable so that said element is capable of being paid out and retracted in accordance with movements of the harness, inertia locking means connected with said reel for locking said reel in response to acceleration applied to the harness and element above a predetermined level, gas actuated means for rapidly actuating said reel in a direction to rapidly wind said element on said reel to position the harness in the fully retracted position, said gas actuated means including a gas chamber in said housing adapted to receive gas under pressure, a piston in said chamber and on one face of which the gas is adapted to react, fluid in said chamber and reacting on the opposite face of said piston, and means connected with a part of said chamber having said fluid for arresting the final movement of said piston.

8. In a harness for the occupant of a seat in a high speed vehicle and wherein there is a flexible element attached to the harness, a safety device connected to said element and including a housing, a reel in said housing, said reel adapted to be essentially freely rotatable so that said element is capable of being paid out and retracted in accordance wtih movements of the harness, inertia locking means connected with said reel for locking said reel in response to acceleration applied to the harness and element above a predetermined level, gas actuated means for rapidly actuating said reel in a direction to rapidly wind said element on said reel to position the harness in the fully retracted position, said gas actuated means including a gas chamber in said housing adapted to receive gas under pressure, a piston in said chamber and on one face of which the gas is adapted to react, fluid in said chamber and reacting on the opposite face of said piston, said reel being hollow, and a screw threaded assembly associated with the interior of said hollow reel and engageable by said piston for rotating said reel in response to piston movement.

9. A safety device for a flexible elongate member in the region of an aircraft seat, said safety device comprising a rotary actuator having a housing, a reel provided with a screw thread and mounted for rotation in said housing, said member attached to said reel, a driver engaging said screw thread, a piston disposed in said housing, means mounting said piston in alignment with said driver, said housing having a pressure fluid inlet port to deliver fluid under pressure against a face of said piston and thereby move said piston in a direction to actuate said driver and rotate said reel, buffering means in said housing yieldingly opposing the movement of said piston in one direction, said buffering means including a liquid chamber in said housing and containing a liquid, a vent orifice in communication with said chamber and through which the liquid is bled as said piston is moved in said one direction, said driver comprising a ball nut assembly engaged with said screw thread, and mechanical means connected with said ball nut assembly to prevent the nut from rotating with respect to said housing.

10. A safety device for a flexible elongated element in the region of an aircraft seat comprising a rotary acuator including a housing for mounting on the aircraft seat, reel means having means thereon for fixedly receiving one end of said elongated element, means mounting said reel means in said housing for rotation about an axis in opposite directions toward and away from a limiting position wherein a maximum length of said element is wound thereabout, said housing having an opening therein adjacent said reel means for passage of the elongated element extending from said reel means outwardly of said housing, means within said housing defining an expansible gas pressure chamber including gas pressure responsive means movable with respect to said reel means in the direction of said axis in response to the communication of gas under pressure with said gas pressure chamber, means defining a charge receiving chamber for receiving a ballistic charge capable of creating a gas pressure therein upon ignition, means communicating said charge receiving chamber with said gas pressure chamber within said housing so that said pressure responsive means will be moved in response to the ignition of a ballistic charge within said charge receiving chamber, means within said housing movable with respect to said reel means in the direction of said axis operatively connecting said pressure responsive means with said reel means for effecting a rapid rotation of said reel means in a direction toward said limiting position in response to the axial movement of said pressure responsive means when said reel means is disposed in a position away from said limiting position, spring means within said housing operatively connected between the latter and said reel means for resiliently biasing said reel means into said limiting position, and inertia locking means within said housing operatively connected with said reel means for locking the latter against movement in a direction away from said limiting position in response to acceleration of said reel above a predetermined value in a direction away from said limiting position.

11. A safety device as defined in claim 10 including manually operable means for releasing said inertia locking means and for selectively restraining said reel means against rotation in any selected position within the limits of movement thereof.

12. Apparatus for controlling the movement of a harness of the type adapted to be worn by an occupant of an aircraft seat or the like comprising a housing for mounting in a position adjacent the harness, reel means for fixedly receiving one end of an elongated element connected with the harness, means mounting said reel means in said housing for rotation in opposite directions toward and away from a limiting position wherein a maximum length of said element is wound thereabout and the harness connected therewith serves to hold the occupant against the seat back, spring means within said housing operatively connected between the latter and said reel means for resiliently urging the latter to rotate in a direction toward said limiting position whereby said element will pay out from said reel in response to movement of the occupant away from the seat back and will be wound around said reel means in response to the movement of the occupant toward said seat back, inertia locking means operatively connected with said reel means for positively locking the same against rotation in a direction away from said limiting position in response to a predetermined acceleration force acting in a direction to cause the seat occupant to move rapidly away from the seat back and hence to rapidly pay out the elongated element, and means operable by the gas generated in response to the ignition of a gas generating ballistic charge for rapidly rotating said reel means into said limiting position when said reel means is disposed in a position away from said limiting position.

13. Apparatus as defined in claim 12 including manually operable means for releasing said inertia locking means and for selectively restraining said reel means against rotation in any selected position within the limits of movement thereof.

14. A ballistic actuated device comprising an elongated housing including a pair of longitudinally spaced end closures and a peripheral wall extending therebetween defining a pair of chamber therein disposed in longitudinally aligned side-by-side relation between said end closures, a reel mounted within one chamber of said housing for rotational movement about a longitudinal axis, said housing having an opening formed in the peripheral wall thereof communicating with said one chamber, an elongated flexible element extending through said opening and having one end portion thereof fixed to said reel to be wound around the exterior periphery thereof in response to rotational movement of said reel in one direction, said reel having means defining a generally cylindrical opening in the interior thereof having an axis coincident with the axis of rotation of said reel, a driving member mounted within said housing for longitudinal movement within said cylindrical opening between first and second operative positions, means operatively connected between said driving member and said housing for preventing rotational movement of said member in said one direction during the longitudinal movement thereof from said first operative position to said second operative position, interengaging helical groove and ball means between the interior periphery of said opening and the exterior periphery of said member for effecting a rotational movement of said reel in said one direction in response to the movement of said member from said first operative position to said second operative position, the other of said chambers being defined by one of said end closures and a cylindrical interior surface of said peripheral wall, a piston mounted within said other chamber with the periphery thereof sealingly engaging said cylindrical surface for sliding movement from a first operative position adjacent said one end closure to a second operative position spaced from said one end closure, means for receiving a ballistic charge capable of generating high pressure gases upon ignition, a ballistic charge in said charge receiving means, means for communicating said charge receiving means with said other chamber between said one end closure and said piston when the latter is disposed in said first operative position so that the high pressure gases created by the ignition of said charge will effect movement of the piston within said other chamber from said first operative position to said second operative position, and means for operatively connecting said piston with said driving member to effect movement of said member from said first operative position to said second operative position in response to the movement of said piston from said first operative position to said second operative position whereby said reel will be rotated in said one direction to reel in said flexible element on the periphery thereof in response to the ignition of said charge in said charge receiving means.

15. Apparatus for controlling the movement of a harness of the type adapted to be worn by an occupant of an aircraft seat or the like comprising a housing for mounting in a position adjacent the harness, reel means for fixedly receiving one end of an elongated element operatively connected with the harness, means mounting said reel means in said housing for rotation in opposite directions toward and away from a limiting position wherein a maximum length of said element is wound thereabout and the harness serves to hold the occupant against the seat back, means within said housing operatively connected between the latter and said reel means for resiliently urging the latter to rotate in a direction toward said limiting position so that said element will pay out from said reel in response to movement of the occupant away from the seat back and will be wound around said reel means in response to the movement of the occupant toward said seat back, means operatively connected with said reel means for stopping the rotation of the same in a direction away from said limiting position in response to a predetermined force acting in a direction to cause the seat occupant to move rapidly away from the seat back and hence to rapidly pay out the elongated element, means for receiving a gas generating ballistic charge, a gas generating ballistic charge in said receiving means, and means operatively connected with said ballistic charge receiving means and with said reel means operable by the gas generated in response to the ignition of said gas generating ballistic charge within said receiving means for rapidly rotating said reel means into said limiting position when said reel means is disposed in a position away from said limiting position.

16. Apparatus as defined in claim 15 including fluid buffering means for controlling the speed of rotation of said reel means by said ballistic charge responsive means.

References Cited in the file of this patent
UNITED STATES PATENTS

| | | |
|---|---|---|
| 2,298,717 | Nardone | Oct. 13, 1942 |
| 2,373,385 | Davie | Apr. 10, 1945 |
| 2,477,907 | Smith | Aug. 2, 1949 |
| 2,478,540 | Martin | Aug. 9, 1949 |
| 2,623,707 | Cook et al. | Dec. 30, 1952 |
| 2,650,655 | Neahr et al. | Sept. 1, 1953 |
| 2,701,693 | Nordmark et al. | Feb. 8, 1955 |
| 2,771,128 | Doolittle | Nov. 20, 1956 |
| 2,815,008 | Hirt | Dec. 3, 1957 |
| 2,829,850 | Culver | Apr. 8, 1958 |
| 2,843,335 | Hoven et al. | July 15, 1958 |
| 2,845,234 | Cushman | July 29, 1958 |
| 2,883,123 | Finningan | Apr. 21, 1959 |
| 2,899,146 | Barecki | Aug. 11, 1959 |
| 2,904,286 | Bleck | Sept. 15, 1959 |
| 2,992,790 | Cushman et al. | July 18, 1961 |